(12) United States Patent
Choi

(10) Patent No.: US 10,795,359 B2
(45) Date of Patent: Oct. 6, 2020

(54) APPARATUS AND METHOD OF CONTROLLING AUTONOMOUS DRIVING AND AUTONOMOUS PARKING THROUGH NAVIGATION APPARATUS

(71) Applicants: Hyundai Motor Company, Seoul (KR); Kia Motors Corporation, Seoul (KR)

(72) Inventor: Kwang Hun Choi, Siheung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 43 days.

(21) Appl. No.: 15/821,118

(22) Filed: Nov. 22, 2017

(65) Prior Publication Data

US 2018/0373249 A1    Dec. 27, 2018

(30) Foreign Application Priority Data

Jun. 22, 2017 (KR) .................. 10-2017-0079047

(51) Int. Cl.
| | |
|---|---|
| *G05D 1/00* | (2006.01) |
| *G01C 21/36* | (2006.01) |
| *G05D 1/02* | (2020.01) |
| *G01C 21/34* | (2006.01) |

(Continued)

(52) U.S. Cl.
CPC ....... *G05D 1/0088* (2013.01); *G01C 21/3492* (2013.01); *G01C 21/3605* (2013.01); *G01C 21/3667* (2013.01); *G01C 21/3685* (2013.01); *G05D 1/0061* (2013.01);

(Continued)

(58) Field of Classification Search
None
See application file for complete search history.

(56) References Cited

U.S. PATENT DOCUMENTS 8,368,558 B2 *  2/2013  Nagase ............. G01C 21/3617
                                                340/932.2
2005/0096974 A1 *  5/2005  Chagoly .................. G08G 1/14
                                                705/13

(Continued)

FOREIGN PATENT DOCUMENTS

| JP | 2006244144 A | * | 9/2006 | |
|---|---|---|---|---|
| JP | 5051010 B2 | * | 6/2008 | ......... G01C 21/3685 |

(Continued)

OTHER PUBLICATIONS

English Translation of JP5051010B2 from Google Patents (Jun. 11, 2008).*

*Primary Examiner* — Jean Paul Cass
(74) *Attorney, Agent, or Firm* — Morgan, Lewis & Bockius LLP

(57) ABSTRACT

A method of controlling an autonomous vehicle may include receiving destination information before autonomous driving, providing parking space information corresponding to the destination information, receiving first parking selection information related to the parking space information, and performing the autonomous driving based on the destination information and the first parking selection information, and the autonomous driving includes movement of the autonomous vehicle to a first position corresponding to the destination information and the first parking selection information.

14 Claims, 10 Drawing Sheets

(51) Int. Cl.
    *G08G 1/14*    (2006.01)
    *G08G 1/16*    (2006.01)

(52) U.S. Cl.
    CPC ... *G05D 1/0274* (2013.01); *G05D 2201/0213* (2013.01); *G08G 1/141* (2013.01); *G08G 1/168* (2013.01)

(56) References Cited

U.S. PATENT DOCUMENTS

| | | | | |
|---|---|---|---|---|
| 2009/0322565 | A1* | 12/2009 | Faber | B62D 15/027 340/932.2 |
| 2010/0017084 | A1* | 1/2010 | Riegel | B60T 7/22 701/70 |
| 2010/0039292 | A1* | 2/2010 | Scherl | B62D 15/028 340/932.2 |
| 2014/0085111 | A1* | 3/2014 | Faber | B62D 15/027 340/932.2 |
| 2014/0121883 | A1* | 5/2014 | Shen | B62D 15/0285 701/28 |
| 2014/0180523 | A1 | 6/2014 | Reichel et al. | |
| 2014/0210646 | A1* | 7/2014 | Subramanya | G06K 9/00812 340/928 |
| 2014/0249742 | A1* | 9/2014 | Krivacic | G06Q 10/02 701/400 |
| 2015/0344028 | A1* | 12/2015 | Gieseke | B62D 15/028 701/1 |
| 2016/0019790 | A1* | 1/2016 | Tobolski | G08G 1/096838 340/932.2 |
| 2016/0125736 | A1 | 5/2016 | Shaik | |
| 2016/0368491 | A1* | 12/2016 | Hauler | B60W 10/20 |
| 2017/0180491 | A1* | 6/2017 | Ishikawa | G08G 1/20 |
| 2017/0329346 | A1* | 11/2017 | Latotzki | G05D 1/0088 |
| 2018/0052456 | A1* | 2/2018 | Schoenfeld | G05D 1/0033 |
| 2018/0053417 | A1* | 2/2018 | Rolf | G08G 1/143 |
| 2018/0121864 | A1* | 5/2018 | Sullivan | G07C 5/0866 |
| 2018/0286236 | A1* | 10/2018 | Mazzola | G01C 21/3664 |
| 2018/0373249 | A1* | 12/2018 | Choi | G01C 21/3605 |
| 2019/0004524 | A1* | 1/2019 | Wang | G01C 21/3415 |
| 2019/0043356 | A1* | 2/2019 | Subramanya | G08G 1/147 |
| 2019/0066502 | A1* | 2/2019 | Du | G08G 1/096827 |
| 2020/0020165 | A1* | 1/2020 | Tran | G06N 7/005 |
| 2020/0071075 | A1* | 3/2020 | Lee | B65G 1/0485 |
| 2020/0079380 | A1* | 3/2020 | Yu | B60W 40/105 |
| 2020/0195833 | A1* | 6/2020 | Sivan | G06F 3/013 |

FOREIGN PATENT DOCUMENTS

| | | | |
|---|---|---|---|
| JP | 2015-230641 A | 12/2015 | |
| KR | 10-2013-0091907 A | 8/2013 | |
| KR | 10-2015-0074871 A | 7/2015 | |
| KR | 10-2016-0066776 A | 6/2016 | |
| WO | WO-2016020023 A1 * | 2/2016 | G08G 1/146 |

\* cited by examiner

FIG. 8
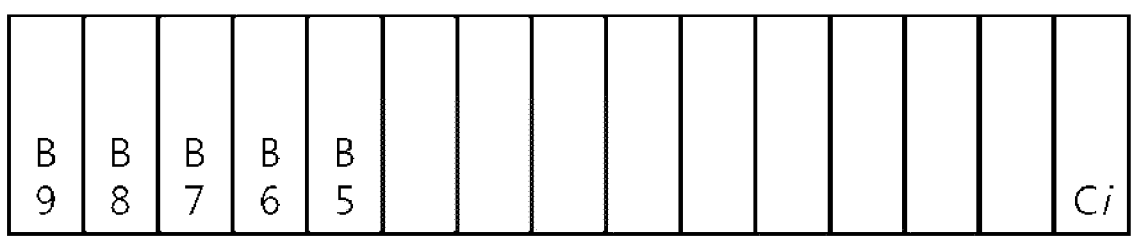
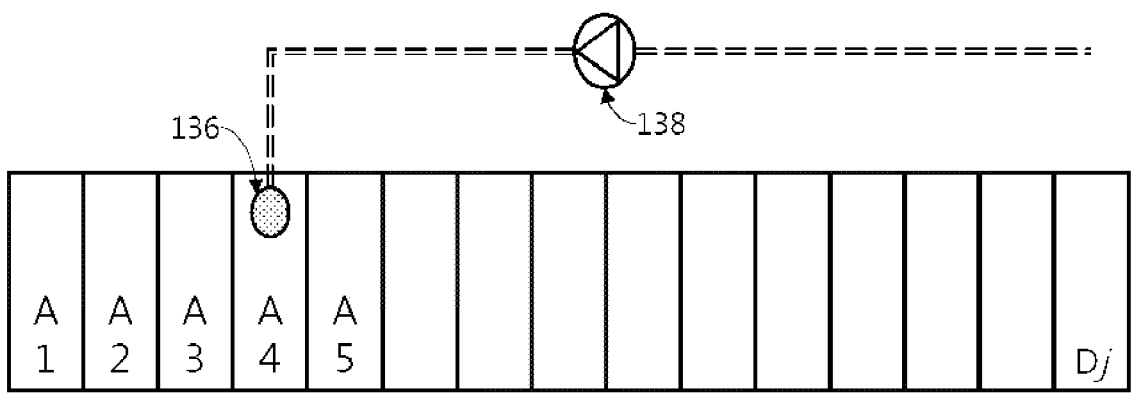

APPARATUS AND METHOD OF CONTROLLING AUTONOMOUS DRIVING AND AUTONOMOUS PARKING THROUGH NAVIGATION APPARATUS

CROSS-REFERENCE TO RELATED APPLICATION

The present application claims priority to Korean Patent Application No. 10-2017-0079047, filed on Jun. 22, 2017, the entire contents of which is incorporated herein for all purposes by this reference.

BACKGROUND OF THE INVENTION

Field of the Invention

The present invention relates to an apparatus and method of controlling autonomous driving and autonomous parking through a navigation apparatus, and more particularly, to an apparatus and method which may provide autonomous driving and autonomous parking functions to a user according to driving environments or peripheral environments.

Description of Related Art

In general, driving of a vehicle may signify an overall process from when a driver or a user starts an engine of the vehicle to before the driver or the user turns off the engine of the vehicle. If driving is defined as such, driving of the vehicle may include parking of the vehicle.

An autonomous vehicle may signify a vehicle which may autonomously drive toward a provided destination by recognizing peripheral environments, determining a driving condition and controlling itself without driver intervention. Such an autonomous vehicle may reduce vehicular accidents, increase transportation efficiency, save fuel and autonomously drives, and thus is expected to serve as a future personal transportation device which may increase convenience in driving. However, autonomous driving is limited to a case that an autonomous vehicle is driven on a road. That is, a process of starting driving of the autonomous vehicle from a departure point and a process of parking the autonomous vehicle at a destination are executed by a driver.

Driving of a vehicle on a road and locating (i.e., parking) of the autonomous vehicle in a specific space (for example, a parking area) are technically different. The reason for this is that vehicle driving and vehicle parking may be different in terms of vehicle operating and controlling methods therein and information to be recognized by an autonomously driving vehicle and information to be recognized by an autonomously parking vehicle may be different.

An autonomous parking system has been developed as an apparatus to assist a driver having poor parking skills. For example, if a vehicle recognizes a specific space at which the autonomous vehicle may be located, the autonomous vehicle may autonomously park in the corresponding space.

As expectations for autonomous vehicles become high, a method in which a user does not operate a vehicle from when the driver starts an engine of the autonomous vehicle to before the user turns off the engine of the autonomous vehicle is required. Particularly, in a situation in which human and material damages are caused by accidents by reversing of vehicles, in order to increase vehicle stability, it is necessary to provide both an autonomous driving function and an autonomous parking function.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method of controlling autonomous driving and autonomous parking through a navigation apparatus that substantially obviate one or more problems due to limitations and disadvantages of the related art.

Various aspects of the present invention are directed to providing an apparatus and method which may provide autonomous driving and autonomous parking functions to a user according to driving environments or peripheral environments.

Various aspects of the present invention are directed to providing an apparatus and method which may perform autonomous driving of a vehicle to a destination and autonomous parking of the autonomous vehicle at the destination in connection with each other according to information received from the destination during a process of inputting the destination after start of an engine of the autonomous vehicle.

Various aspects of the present invention are directed to providing an apparatus and method which may perform autonomous driving and autonomous parking of a vehicle corresponding to user input according to driving environments/conditions and parking environments/conditions of the autonomous vehicle and, if autonomous driving and parking of the autonomous vehicle corresponding to user input are not performed in a response to change in driving environments/conditions and parking environments/conditions, provide an interface to receive user input corresponding to such a situation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

To achieve these objects and other advantages and in accordance for the invention, as embodied and broadly described herein, a method of controlling an autonomous vehicle may include receiving destination information before autonomous driving, providing parking space information corresponding to the destination information, receiving first parking selection information related to the parking space information, and performing the autonomous driving based on the destination information and the first parking selection information, wherein the autonomous driving may include movement of the autonomous vehicle to a first position corresponding to the destination information and the first parking selection information.

The method may further include re-providing the parking space information, if it is determined that the vehicle is incapable of being located at the first position before the autonomous driving is completed, receiving second parking selection information related to the parking space information, and locating the vehicle at a second position corresponding to the second parking selection information.

The parking space information may include position information corresponding to respective parking spaces in a parking lot provided in a space corresponding to the destination information.

The re-providing of the parking space information may include determining whether or not there is an obstacle on a path reaching the first position, after the autonomous vehicle arrives at a position corresponding to the destination information, confirming whether or not an obstacle or another vehicle is located at the first position, determining whether or not the autonomous vehicle is capable of being located at the first position, and providing the parking space information based on a result of the determination.

The parking space information may include the number of available parking spaces in a parking lot provided in a space corresponding to the destination information, or include area information in the parking lot and the number of available parking spaces in each area of the area information.

If the number of the available parking spaces in the parking lot is a predetermined ratio or less, the parking space information may be re-provided.

The method may further include automatically terminating the autonomous driving depending on predetermined user input or detected driving environments or conditions during the autonomous driving.

The method may further include providing an interface for the autonomous driving, if a driver gets in the autonomous vehicle.

The method may further include providing a road map corresponding to the destination information and providing a parking lot map corresponding to the parking space information.

If the parking space information corresponding to the destination information is not provided, the autonomous driving may be terminated when the autonomous vehicle arrives at a position corresponding to the destination information.

In another aspect of the present invention, there is provided a computer readable recording medium of recording an application program executed by a processor to implement the method.

In another aspect of the present invention, an navigation apparatus of an autonomous vehicle may include a storage device configured to store map information and parking space information, an input device configured to receive destination information corresponding to the map information and first parking selection information from the parking space information corresponding to the destination information, an output device configured to display a moving process of the autonomous vehicle on the map information and the parking space information, and a controller configured to confirm a moving path to the destination information collected through the input device and availability of a first position corresponding to the first parking selection information during autonomous driving of the autonomous vehicle.

The controller may receive second parking selection information related to the parking space information through the input device, in a response to the availability of the first position.

The navigation apparatus may further include a communication device configured to acquire first information regarding the moving path and second information corresponding to the availability of the first position through a wireless communication network.

The communication device may receive the first information from a traffic information network server providing traffic information, and receive the second information from one of the traffic information network server and a parking facility providing the parking space information.

The parking space information may include position information corresponding to respective parking spaces in a parking lot provided in a space corresponding to the destination information.

The controller may be configured to determine whether or not there is an obstacle on a path reaching the first position, after the autonomous vehicle arrives at a position corresponding to the destination information, confirm whether or not an obstacle or another vehicle is located at the first position, and determine whether or not the autonomous vehicle is configured for being located at the first position.

The input device may provide the parking space information based on a result of the determination of the controller.

The parking space information may include the number of available parking spaces in a parking lot provided in a space corresponding to the destination information, or area information in the parking lot and the number of available parking spaces in each area of the area information.

If the controller determines that the number of the available parking spaces in the parking lot is a predetermined ratio or less, the input device may re-provide the parking space information.

The controller may automatically terminate the autonomous driving depending on predetermined user input or detected driving environments or conditions during the autonomous driving.

The controller may activate the input device configured for the autonomous driving, if a driver gets in the autonomous vehicle.

In yet another aspect of the present invention, a telematics information server may include a storage device configured to store road information and building information, a first information providing device configured to update traffic volume and use restriction information corresponding to the road information in real time and to provide the traffic volume and the use restriction information in a response to a first request of a vehicle, a second information providing device configured to update parking lot information corresponding to the building information in real time and to provide the parking lot information in a response to a second request of the vehicle, and a transceiver device configured to receive the first request and the second request and to transmit outputs of the first information providing device and the second information providing device through a wireless communication network.

The first request and the second request may be distinguishably transmitted to the telematics information server, and outputs of the first information providing device and the second information providing device corresponding to the first request and the second request may be performed within a predetermined time.

The telematics information server may further include a controller configured to receive a state of the autonomous vehicle through the transceiver device and to control operations of the first information providing device and the second information providing device in a response to the received state of the autonomous vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a view illustrating a parking information image of the navigation apparatus of the autonomous vehicle.

Figure 1:
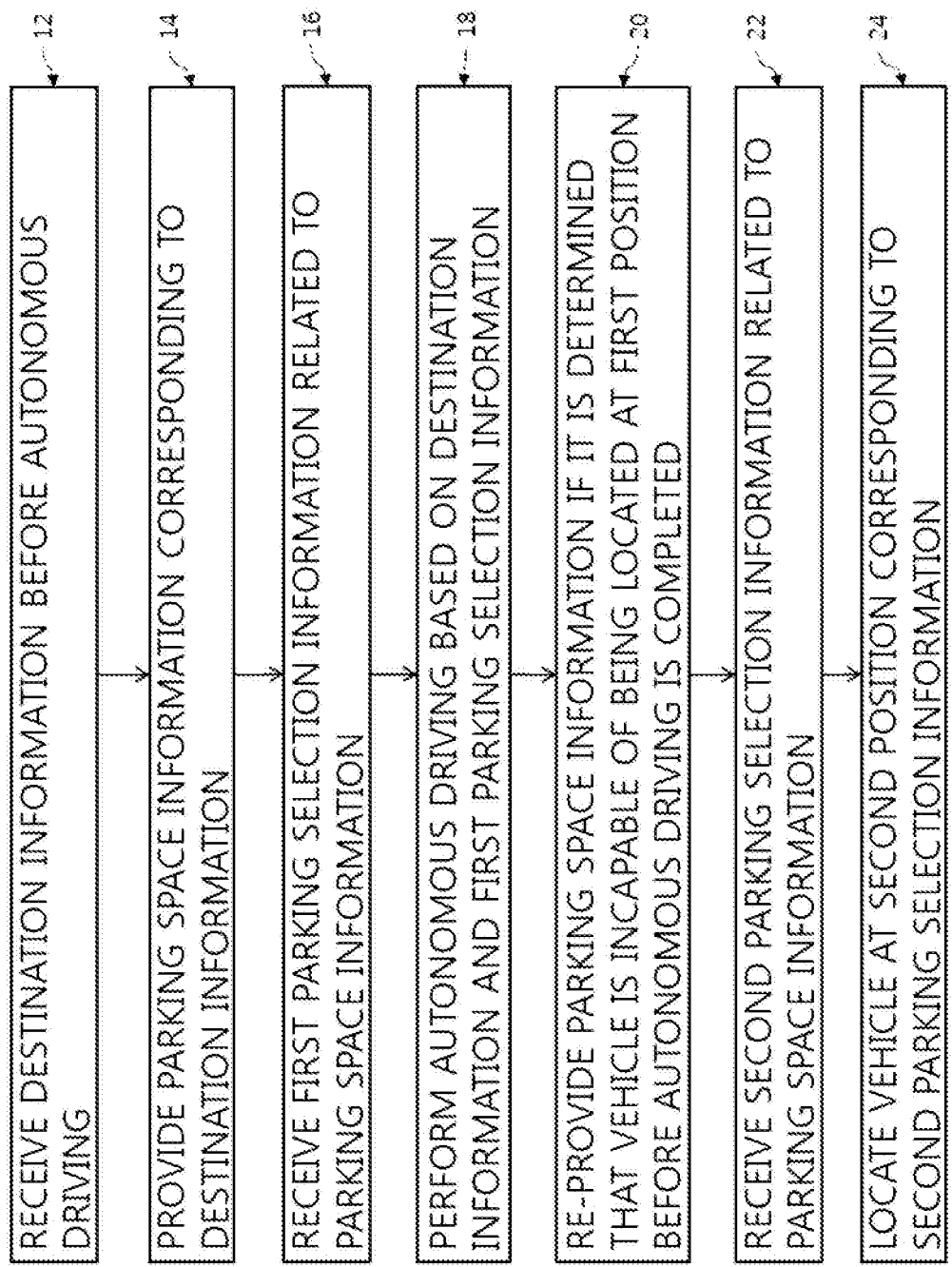
FIG. 1 is a flowchart illustrating a method of controlling an autonomous vehicle in accordance with various aspects of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made more specifically to the exemplary embodiments of the present invention, examples of which are illustrated in the accompanying drawings. The suffixes "module" and "unit" used in the description below are provided or used together only in consideration of ease in preparation of the specification and do not have distinctive meanings or functions.

In the description of the embodiments, it will be understood that, when an element is "on (above)" or "under (below)" another element, the two elements may directly contact each other or one or more other elements may be located between the two elements. Furthermore, it will be understood that the expression "on (above)" or "under (below)" may encompass not only an upward direction but also a downward direction of one element.

FIG. 1 is a flowchart illustrating a method of controlling an autonomous vehicle in accordance with various aspects of the present invention.

As exemplarily shown in the present figure, a method of controlling an autonomous vehicle may include receiving destination information before autonomous driving (Operation 12), providing parking space information corresponding to the destination information (Operation 14), receiving first parking selection information related to the parking space information (Operation 16), and performing autonomous driving based on the destination information and the first parking selection information (Operation 18). Here, autonomous driving may include movement of the autonomous vehicle to a first position corresponding to the destination information and the first parking selection information.

Technology that collects information regarding a moving path from a departure point to a destination through apparatuses, a navigation system, GPS, etc., and informs a user or a driver of the collected information or controls movement of a vehicle based on the corresponding information has been increasingly developed. Furthermore, technology that controls a vehicle to autonomously park in a limited space (for example, side parking or back parking) has been developed.

In control of movement of a vehicle on the moving path, information regarding the position of the autonomous vehicle acquired through the GPS for monitoring whether or not the autonomous vehicle is located on the moving path, information regarding driving environments (peripheral obstacles or vehicles around the corresponding vehicle) for vehicle acceleration/deceleration and lane change may be required. Furthermore, in control of a vehicle to autonomously park in a limited space, rather than information acquired through the GPS, information acquired through various detectors mounted in the autonomous vehicle may be required to recognize an available parking space around the autonomous vehicle and to control movement of the autonomous vehicle in a manner suitable for the available parking space while preventing the autonomous vehicle from colliding with peripheral obstacles and vehicles.

Information acquired by the GPS may have an error range of several meters to tens of meters and is thus not used in vehicle parking. Therefore, a navigation apparatus as a device of assisting vehicle driving and an autonomous parking function as a device of assisting vehicle parking may be divided from each other and mounted in a vehicle. However, if autonomous driving is supported during an overall process from when a driver or a user starts an engine of the autonomous vehicle to before the driver or the user turns off the engine of the autonomous vehicle to drive the autonomous vehicle through one apparatus or an integrated interface, driver or user convenience may be increased. For the present purpose, an apparatus of controlling autonomous driving of a vehicle may not only receive destination information but also provide parking space information corresponding to the destination information and receive first parking selection information regarding the parking space information from a user or a driver. The apparatus may not only move the autonomous vehicle to a driver desired destination but also locate the autonomous vehicle in a parking space provided at the destination, based on the destination information and the first parking selection information.

Furthermore, the method of controlling the autonomous vehicle may further include re-providing the parking space information if it is determined that the autonomous vehicle is incapable of being located at the first position corresponding to the first parking selection information before autonomous driving is completed (Operation 20), receiving second parking selection information related to the parking space information (Operation 22), and locating the autonomous vehicle at a second position corresponding to the second parking selection information (Operation 24).

If a defect of a moving path set based on destination information occurs or if change in the moving path is required due to increase in traffic, the autonomous vehicle may reset the corresponding moving path and move to the destination. Furthermore, in addition to occurrence of the defect of the moving path, the autonomous vehicle may be obstructed during a parking process in a parking lot and, in the instant case, the parking space may be reset.

Conventionally, to divide and identify parking spaces in a parking lot and to locate the autonomous vehicle at a corresponding parking space, information acquired from the GPS is not used and information regarding the corresponding parking lot (for example, a parking lot map) and information acquired by a position detector mounted in the autonomous vehicle may be used.

The information regarding the parking lot may include a parking lot map, availabilities of parking spaces, occupancies of parking areas or a corresponding floor, the number of available parking spaces, etc. Out of the information regarding the parking lot, the parking lot map, the position of the parking lot, etc. may be included in map data to interwork with road information and map information. If map data stored in the navigation apparatus does not include the information regarding the parking lot, the navigation apparatus may collect the corresponding information through a wireless communication network.

Furthermore, out of the information regarding the parking lot, availabilities of the parking spaces, occupancies of the parking areas or the corresponding floor, the number of the available parking spaces, etc. are varied in real time. Such information, when the autonomous vehicle approaches the destination within a predetermined range, may be acquired through direct communication with a data providing apparatus of a facility located at the destination or wireless connection with a network server providing traffic information, parking lot information, etc. through wireless communication technology.

Parking space information acquired by the autonomous vehicle may include position information corresponding to respective parking spaces in a parking lot provided in a space corresponding to the destination information. For example, the position information may be GPS information on the parking spaces and, particularly, be a parking lot map including an overall size of the parking lot, division between the parking spaces, sizes of the respective parking spaces, etc. Since a parking space of a vehicle is a small space not exceeding a size of several meters in width and length, the parking space information is provided such that position information having accuracy within at least tens of centimeters or several meters may be used.

The autonomous vehicle may identify respective parking spaces in the parking space information and be located in a desired parking space using detectors mounted in the autonomous vehicle based on the parking space information. In the instant case, re-providing of the parking space information (Operation 20) may include determining whether or not there is an obstacle on a path to the first position, after the autonomous vehicle arrives at a position corresponding to the destination information, confirming whether or not an obstacle or another vehicle is located at the first position, determining whether or not the autonomous vehicle is capable of being located at the first position, and providing the parking space information based on a result of the determination.

According to embodiments, the parking space information may include the number of available parking spaces in a parking lot provided in a space corresponding to the destination information, or area information in the parking lot and the number of available parking spaces in each area. The parking space information is not provided so that the autonomous vehicle may autonomously search for a parking space using position information having accuracy within at least tens of centimeters or several meters, and may be provided as broad information including a utilization rate of the parking spaces. In the instant case, the autonomous vehicle may have difficulty in parking in a specific parking space. However, the autonomous vehicle may autonomously search for an area where the autonomous vehicle can easily park or be automatically located in an actually vacant (available) parking space in the area where the autonomous vehicle is easily parked, based on the parking space information.

If the number of the available parking spaces in the parking lot is a predetermined ratio or less, the control apparatus may re-provide the parking space information to the user or the driver. For example, if 99 parking spaces are occupied out of a total of 100 parking spaces in a first basement level in the parking space information corresponding to the destination information, moving the autonomous vehicle to a second basement level or a third basement level may be more efficient than moving the autonomous vehicle to search for one remaining parking space of the first basement level. In the instant case, the autonomous vehicle re-provides parking space information to the user or the driver to reset a parking position, and induces the user or the driver to input new parking selection information based on the re-provided parking space information.

Although not shown in the drawings, the method of controlling the autonomous vehicle may further include automatically terminating autonomous driving of the autonomous vehicle depending on predetermined user input or detected driving environments or conditions during autonomous driving. For the purpose safety in driving, if the autonomous vehicle has difficulty in autonomously moving according recognized driving environments or if the user or the driver determines that it is difficult to entrust the autonomous vehicle to autonomous driving, the user or the driver may automatically terminate autonomous driving of the autonomous vehicle and take over control of the autonomous vehicle.

Furthermore, the method of controlling the autonomous vehicle may further include providing an interface for autonomous driving according to whether or not a driver gets in the autonomous vehicle. For example, for vehicle security and safety in driving, the interface for autonomous driving may be provided when the driver gets in the autonomous vehicle.

The method of controlling the autonomous vehicle may further include providing a road map corresponding to the destination information and providing a parking lot map corresponding to the parking space information. Furthermore, if the parking space information corresponding to the destination information is not provided, for example, if parking lot information is not stored map data or if parking lot information may not be received through a wireless communication network, autonomous driving may be terminated when the autonomous vehicle arrives at a position corresponding to the destination information.

For the autonomous parking function, review of performance development of various detectors and application plans of map data is required. To perform autonomous parking, not only detectors which may be mounted in the autonomous vehicle but also infrastructure including information on parking lots, which may support autonomous parking, positions of vacant parking spaces and parking lot map data, are necessary. However, since establishment of related infrastructure of all building parking lots has many limitations, if the navigation apparatus includes integrated information in such an environment, the navigation apparatus may provide a proper guide and display to the driver or the user. Furthermore, if an error situation including failure of infrastructure disposed in a parking lot, occurs, provision of a proper navigation guide and display to the driver or the user may be necessary. For example, if a vehicle to which the autonomous parking function is applied enters a parking lot where infrastructure is not supported, the navigation apparatus may inform a driver or a user of such a fact and be switched to a mode of providing information on the internal to the parking lot so that the driver or the user may directly park the autonomous vehicle, and thus the driver or the user may receive directions from the navigation apparatus.

Figure 2:
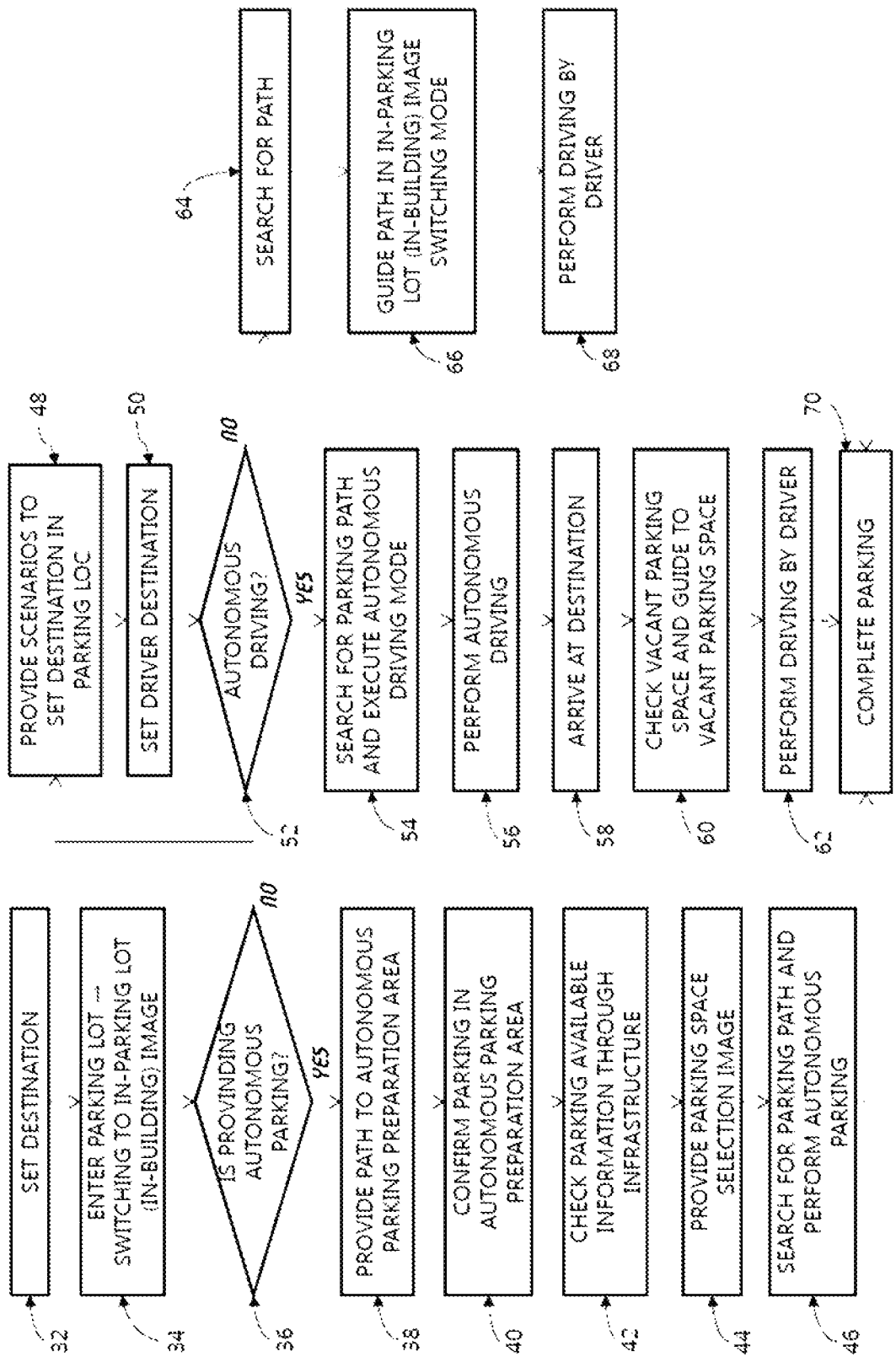
FIG. 2 is a flowchart illustrating operation of a navigation apparatus mounted in the autonomous vehicle.

FIG. 2 is a flowchart illustrating operation of the navigation apparatus mounted in the autonomous vehicle.

As exemplarily shown in the present figure, the navigation apparatus may not only propose information regarding a vehicle movement process from a departure point to a destination but also support the autonomous parking function through a guidance method interlocked with the navigation apparatus in a parking lot for autonomous parking provided in an exemplary embodiment of the present invention to a parking process related to the destination.

To support the autonomous parking function through the navigation apparatus, there is a method of loading a storage device (for example, a database) of the navigation apparatus with data and logics to enable support for autonomous parking. In the instant case, when a driver sets a parking lot which may support autonomous parking as a destination or sets a building including the corresponding parking lot as a destination, if the autonomous vehicle arrives at the destination and enters the parking lot, the navigation apparatus may provide the autonomous parking function. Here, whether or not the autonomous vehicle enters the parking lot may be determined through matching of the autonomous vehicle with a parking lot link.

Furthermore, to support the autonomous parking function through the navigation apparatus, there is a method of receiving information through parking lot infrastructure when the autonomous vehicle enters a parking lot. For example, if the navigation apparatus does not know whether or not the autonomous parking function is supported, and if, when the autonomous vehicle enters a parking lot of a destination set by a driver, the autonomous parking function is capable of being supported through infrastructure of the parking lot, the navigation apparatus may provide the autonomous parking function. For example, the navigation apparatus may receive map information related to the parking lot together with confirmation as to whether or not the autonomous parking function is capable of being supported, through the infrastructure of the parking lot.

An autonomous driving control module may determine whether or not autonomous driving is capable of being supported in the parking lot using map information provided by the navigation apparatus and detector information related to the autonomous vehicle, and transmit a state value, indicating whether or not autonomous driving is capable of being supported, to the navigation apparatus through in-vehicle communication.

With reference to FIG. 2, a user or a driver of an autonomous vehicle may set a destination through an interface of a navigation apparatus (Operation 32).

When the autonomous vehicle enters a parking lot, an image displayed by the navigation apparatus may be converted into an image displaying the internal to the parking lot (or a building) (Operation 34).

Thereafter, the autonomous vehicle may determine whether or not the parking lot, which the autonomous vehicle enters, is capable of supporting an autonomous parking function (Operation 36).

If the parking lot is capable of supporting the autonomous parking function ('YES' in Operation 36), the navigation apparatus may provide a path to an autonomous parking preparation area (Operation 38).

After the autonomous vehicle is parked in the autonomous parking preparation area (Operation 40), the navigation apparatus may confirm whether or not a corresponding area is available through infrastructure provided by the parking lot (i.e., parking available information) (Operation 42).

If the corresponding area is available, the navigation apparatus may provide an image to select a parking space within the corresponding parking area (Operation 44).

The navigation apparatus may receive user input through the provided image, search for a path to a parking area designated by the user and perform autonomous parking of the autonomous vehicle, i.e., move the autonomous vehicle to the corresponding parking area (Operation 46). When the autonomous vehicle is located in the corresponding parking area, autonomous parking may be completed (Operation 70).

The navigation apparatus may recognize that the parking lot, which the autonomous vehicle enters, does not support the autonomous parking function ('NO' in Operation 36). If the navigation apparatus may not receive support for the autonomous parking function through the infrastructure of the parking lot, the navigation apparatus may propose scenarios (for example, options) to set a destination in the parking lot using information collected through a communication network or stored in advance (Operation 48).

When the navigation apparatus receives a destination (i.e., a selected parking space) set by the driver through the options (Operation 50), the navigation apparatus may confirm whether or not the driver or the user desires autonomous driving (Operation 52).

If the driver selects a parking space in the parking lot and does not desire autonomous driving ('NO' in Operation 52), the navigation apparatus may search for a path to the parking space (Operation 64).

The navigation apparatus may provide the searched path in an in-parking lot (building) image switch mode (Operation 66). When the driver or the user drives the autonomous vehicle and locates the autonomous vehicle in the parking space selected by the driver or the user based on the corresponding information (Operation 68), parking may be completed (Operation 70).

On the other hand, if the driver selects a parking space in the parking lot and desires autonomous driving ('YES' in Operation 52), the navigation apparatus may search for a path to the selected parking space and maintain the autonomous driving mode (Operation 54). When the autonomous vehicle performs autonomous driving (Operation 56) and arrives at the parking space (the destination) selected by the driver (Operation 58), the navigation apparatus may verify the vacant parking space and guide the driver or the user to the selected vacant parking space (Operation 60). When the autonomous vehicle is located in the parking space selected by the driver or the user based on the corresponding information (Operation 62), parking may be completed (Operation 70).

If, while the autonomous vehicle moves to a selected vacant parking space in the parking lot, the autonomous vehicle has difficulty in driving forwards or the autonomous vehicle has difficulty in parking in the selected parking space, the navigation apparatus needs to propose options selected by the user.

For example, if it is difficult to support the autonomous parking function through the navigation apparatus in the autonomous vehicle, the navigation apparatus first moves the autonomous vehicle to the destination through autonomous driving. If it is determined that it is difficult to support the autonomous parking function at the destination, the navigation apparatus may provide options to set a destination in the parking lot to the driver or the user. Thereafter, the navigation apparatus may select a desired destination in the parking lot input by the user or the driver and search for a path to the destination. The navigation apparatus may confirm whether or not the driver or the user desires autonomous driving and, when the autonomous vehicle arrives at the destination through autonomous driving, confirm a vacant parking space and guide the autonomous vehicle to the parking space.

According to embodiments, if it is difficult to support the autonomous parking function through the navigation apparatus in the autonomous vehicle, the navigation apparatus may provide an image displaying parking lot information to a destination in the parking lot.

Figure 3:
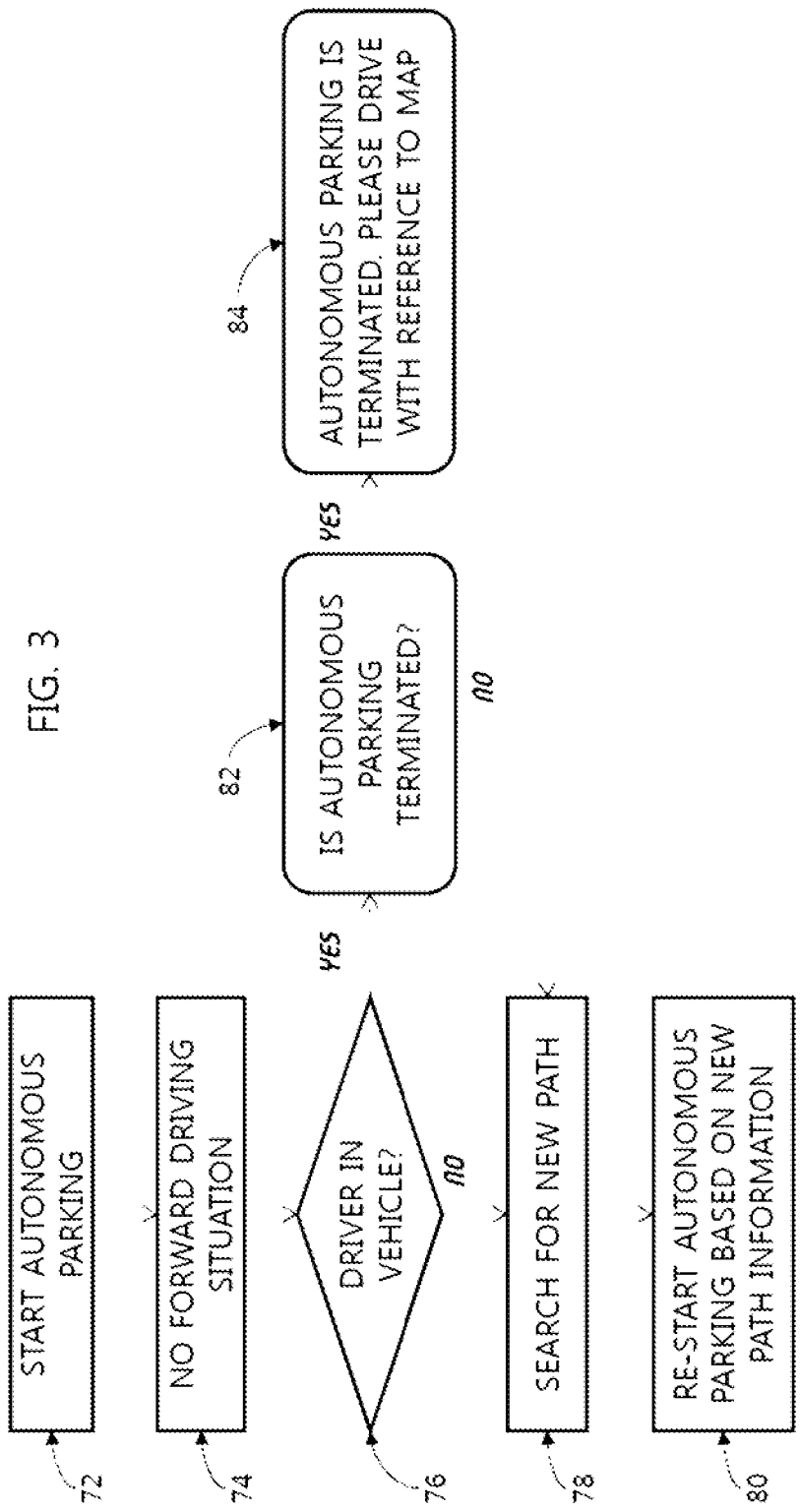
FIG. 3 is a flowchart illustrating a first method of controlling the autonomous vehicle during autonomous parking of the autonomous vehicle.

FIG. 3 is a flowchart illustrating a first method of controlling the autonomous vehicle during autonomous parking of the autonomous vehicle.

As exemplarily shown in FIG. 3, in the first method of controlling the autonomous vehicle during autonomous parking of the autonomous vehicle, autonomous parking of the autonomous vehicle is started (Operation 72) and, while the autonomous vehicle moves to a selected vacant parking space through autonomous driving, the navigation apparatus may recognize a case that the autonomous vehicle has difficulty in driving forwards (Operation 74).

If a driver gets in the autonomous vehicle ('YES' in Operation 76), the navigation apparatus may confirm whether or not a user desires to terminate autonomous parking (Operation 82). If the user recognizes surrounding environments of the autonomous vehicle and then terminates the autonomous parking function ('YES' in Operation 82), the navigation apparatus may output a message "Autonomous parking is terminated" and allow the driver or the user to control the autonomous vehicle (Operation 84).

On the other hand, if no driver gets in the autonomous vehicle ('NO' in Operation 76) or if the user or the driver does not desire to terminate autonomous parking ('NO' in Operation 82), the navigation apparatus may search for a new path to perform the autonomous parking function (Operation 78).

After the navigation apparatus searches for the new path, the autonomous vehicle may restart the autonomous parking function based on the new path information (Operation 80).

Figure 4:
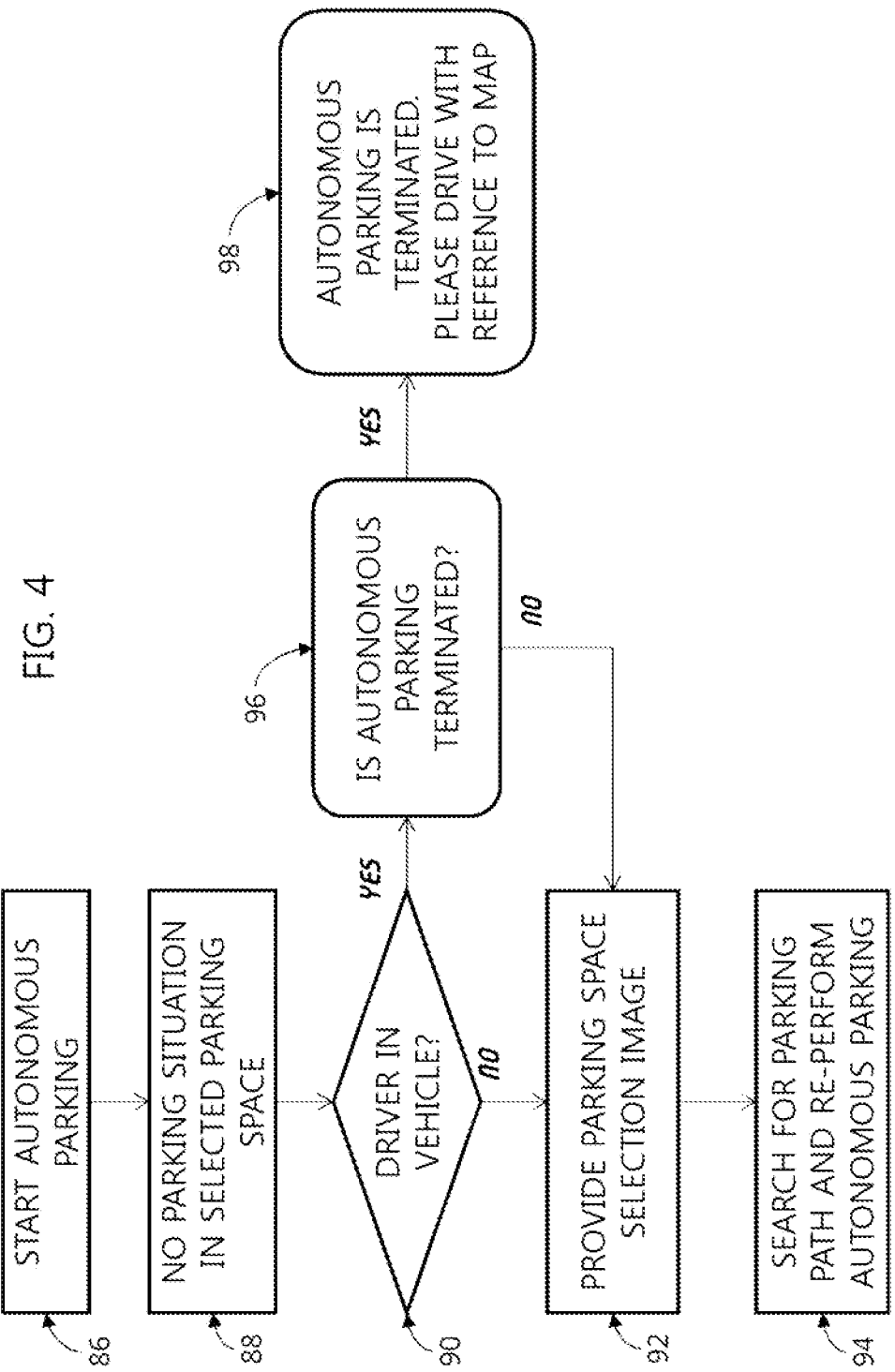
FIG. 4 is a flowchart illustrating a second method of controlling the autonomous vehicle during autonomous parking of the autonomous vehicle.

FIG. 4 is a flowchart illustrating a second method of controlling the autonomous vehicle during autonomous parking of the autonomous vehicle.

As exemplarily shown in the present figure, after the autonomous parking function is started (Operation 86), the navigation apparatus may recognize a case that the autonomous vehicle arrives in a selected parking space but has difficulty in parking in the corresponding space (Operation 88).

If a driver gets in the autonomous vehicle ('YES' in Operation 90), the navigation apparatus may confirm whether or not a user desires to terminate autonomous parking (Operation 96). If the user recognizes surrounding environments of the autonomous vehicle and then terminates the autonomous parking function ('YES' in Operation 96), the navigation apparatus may output a message "Autonomous parking is terminated" and allow the driver or the user to control the autonomous vehicle (Operation 98).

On the other hand, if no driver gets in the autonomous vehicle ('NO' in Operation 90) or if the user or the driver does not desire to terminate autonomous parking ('NO' in Operation 96), the navigation apparatus may provide parking space information so that the user or the driver may select another desired parking space (Operation 92).

After the navigation apparatus searches for a new path corresponding to user or driver input, the autonomous vehicle may restart the autonomous parking function based on new path information (Operation 94).

Figure 5:
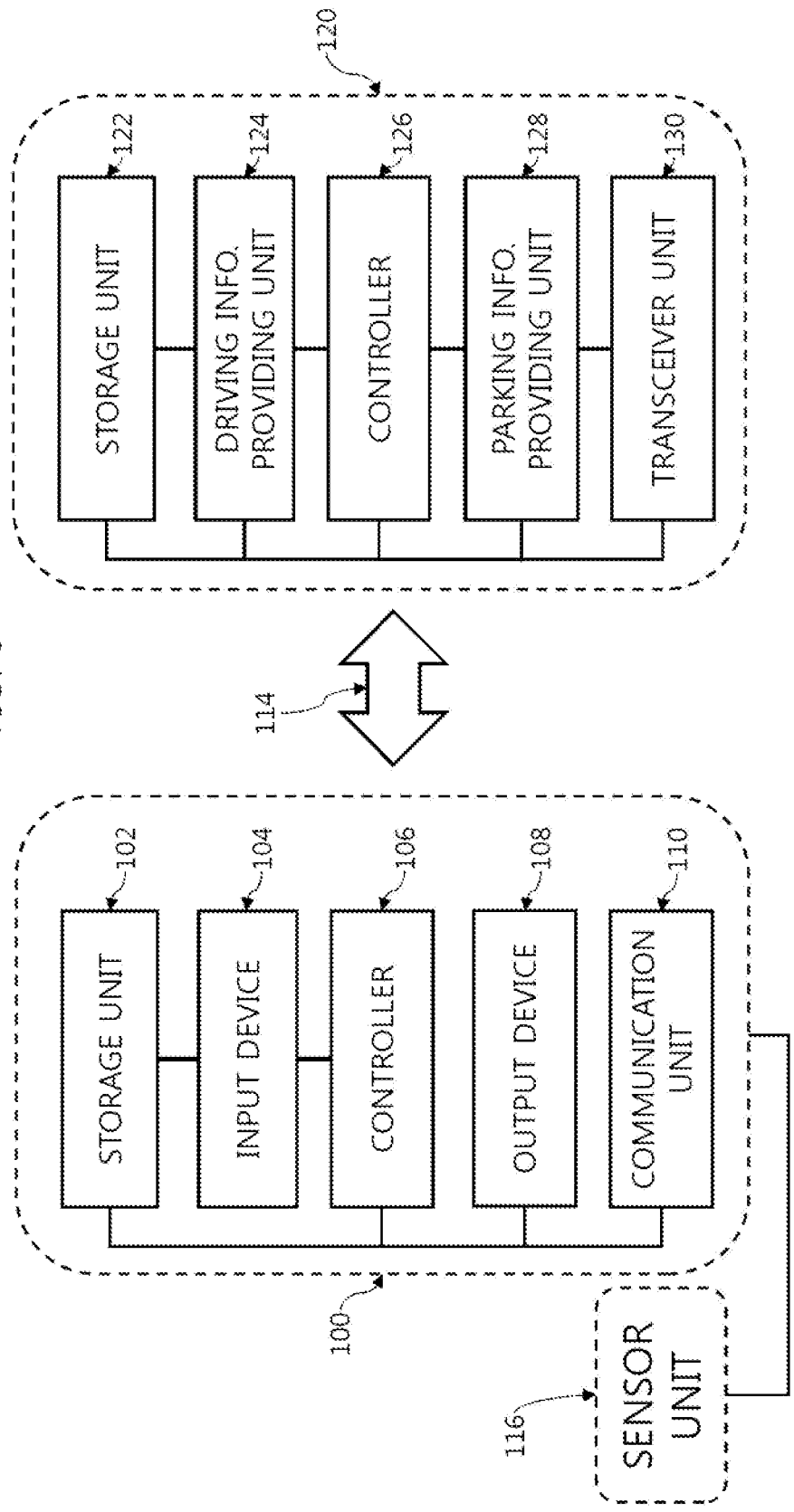
FIG. 5 is a diagram illustrating the navigation apparatus and a telematics information server of the autonomous vehicle.

FIG. 5 is a diagram illustrating the navigation apparatus and a telematics information server of the autonomous vehicle. According to embodiments, a navigation apparatus 100 of the autonomous vehicle may include a processing system which may support the operation or the control method described above with reference to FIGS. 1 to 4. Here, the processing system may include at least one memory device and at least one processor.

As exemplarily shown in the present figure, the navigation apparatus 100 of the autonomous vehicle may be connected to a telematics information server 120 through a wireless communication network 114. Although the navigation apparatus 100 connected to the telematics information server 120 will be exemplarily described, the navigation apparatus 100 may be wirelessly directly connected to an information providing apparatus included in a facility of a parking lot and thus collect information regarding autonomous parking, or be connected to an information providing apparatus providing information including traffic volume, etc. during movement to a destination through a wireless communication network. Furthermore, the navigation apparatus 100 of the autonomous vehicle may collect information regarding movement of the autonomous vehicle and information regarding obstacles and vehicles around the corresponding vehicle through a detector 116 mounted in the autonomous vehicle connected to the navigation apparatus 100 through a communication network for vehicles (for example, CAN communication).

The navigation apparatus 100 of the autonomous vehicle may include a storage device 102 to store map information and parking space information, an input device 104 to receive destination information corresponding to the map information and first parking selection information from the parking space information corresponding to the destination information, an output device 108 to display a moving process of the autonomous vehicle on the map information and the parking space information, and a controller 106 to confirm a moving path to the destination information collected through the input device 104 and availability of a first position corresponding to the first parking selection information during autonomous driving of the autonomous vehicle.

Here, the storage device 102 may be provided as a memory chip built in the navigation apparatus 100 or a detachable memory card. The input device 104 may be provided in a button type, and the output device 108 may be provided as a touch display device. The input device 104 and the output device 108 may be integrated into a single device. For example, a user or a driver may receive map information, parking lot information, etc. through a touch display device, and input destination information and first parking selection information by selecting the corresponding information or inputting text.

In a response to availability of the first position corresponding to the first parking selection information selected by the user, the controller 106 may receive second parking selection information related to parking space information through the input device 104.

To recognize availability of the first position, the navigation apparatus 100 of the autonomous vehicle may further include a communication device 110 to acquire first information regarding the moving path and second information corresponding to the availability of the first position through a wireless communication network. For example, the navigation apparatus 100 of the autonomous vehicle may be connected to a traffic information network server which provides traffic volume, a facility in the parking lot which provides parking lot information (parking space information, availability information, etc.), etc. through the communication device 110. The communication device 110 may receive the first information from the traffic information network server providing traffic information, and receive the second information from one of the traffic information network server and the packing facility providing parking space information. According to embodiments, with reference to FIG. 5, the navigation apparatus 100 of the autonomous vehicle may receive the first information or the second information from the telematics information server 120 connected through a wireless communication network 114.

The parking space information transmitted to the navigation apparatus 100 of the autonomous vehicle may include position information corresponding to respective parking spaces in the parking lot provided in a space corresponding to destination information searched in a response to user input. In the instant case, the controller 106 may determine whether or not there is an obstacle on a path reaching the first position, after the autonomous vehicle arrives at a position corresponding to the destination information, confirm whether or not an obstacle or another vehicle is located at the first position, and determine whether or not the autonomous vehicle is capable of being located at the first position. For example, the controller 106 may determine whether or not the autonomous vehicle moves by collecting peripheral information related to the autonomous vehicle in real time through the detector 116.

The input device 104 may provide parking space information based on a result of determination of the controller 116 of the navigation apparatus 100 of the autonomous vehicle, so that the user or the driver may input new parking selection information. Here, the parking space information may include a parking lot map, a list of available parking spaces in the parking lot, etc. According to embodiments, the parking space information may include the number of available parking spaces in the parking lot provided to the space corresponding to the destination information, or area information in the parking lot and the number of available parking spaces in each area.

If the controller 106 of the navigation apparatus 100 of the autonomous vehicle determines that the number of available parking spaces in the parking lot is a predetermined ratio or less, the input device 104 may re-provide the parking space information so that the user or the driver may input new parking selection information.

Furthermore, the controller 106 may automatically terminate autonomous driving depending on predetermined user input or detected driving environments or conditions during autonomous driving of the autonomous vehicle.

Moreover, when the driver gets in the autonomous vehicle, the controller 106 may activate the input device 104 for autonomous driving.

According to embodiments, the telematics information server 120 connectable to the navigation apparatus 100 of the autonomous vehicle through the wireless communication network 114 may recognize the state of the autonomous vehicle and thus support driving of the autonomous vehicle, and may supply information necessary for the autonomous driving function including the autonomous parking function to the autonomous vehicle.

With reference to FIG. 5, the telematics information server 120 may include a storage device 122 to store road information and building information, a driving information providing device 124 to update traffic volume and use restriction information corresponding to the road information in real time and to provide the traffic volume and the use restriction information in a response to a first request of the autonomous vehicle, a parking information providing device 128 to update parking lot information corresponding to the building information in real time and to provide the parking lot information in a response to a second request of the autonomous vehicle, and a transceiver device 130 to receive the first request and the second request from the autonomous vehicle and to transmit outputs of the driving information providing device 124 and the parking information providing device 128 through the wireless communication network 114.

In the autonomous vehicle, the first request and the second request transmitted to the telematics information server 120 may be distinguished from each other. Furthermore, to provide information supporting autonomous driving including autonomous parking of the autonomous vehicle, the telematics information server 120 may transmit outputs of the driving information providing device 124 and the parking information providing device 128 corresponding to the first request and the second request within a predetermined time.

The telematics information server 120 may further include a controller 126 to receive the state of the autonomous vehicle through the transceiver device 130 and to control operations of the driving information providing device 124 and the parking information providing device 128 in a response to the received state of the autonomous vehicle.

Furthermore, the telematics information server 120 shown in FIG. 5 may be one network server or include a plurality of network servers connected through a communication network.

The navigation apparatus 100 of the autonomous vehicle, supporting the autonomous driving function including autonomous driving, may provide a navigation guide according to an infrastructure situation related to autonomous parking and thus compensate for limit in establishment of infrastructure necessary for an autonomous parking service. Problems which may be obstacles to establishment of infrastructure to support the autonomous parking function may be solved through options, scenarios, etc., provided by the navigation apparatus 100. Furthermore, the navigation apparatus 100 may provide a navigation function in a parking lot by determining environments in which the autonomous parking function is not available, being configured for improving user or driver convenience. For example, if the autonomous parking function is not available, the navigation apparatus 100 may support autonomous driving to a desired destination in the parking lot or automatically provide an interior navigation guide, thus being configured for improving convenience in parking.

Figure 6:
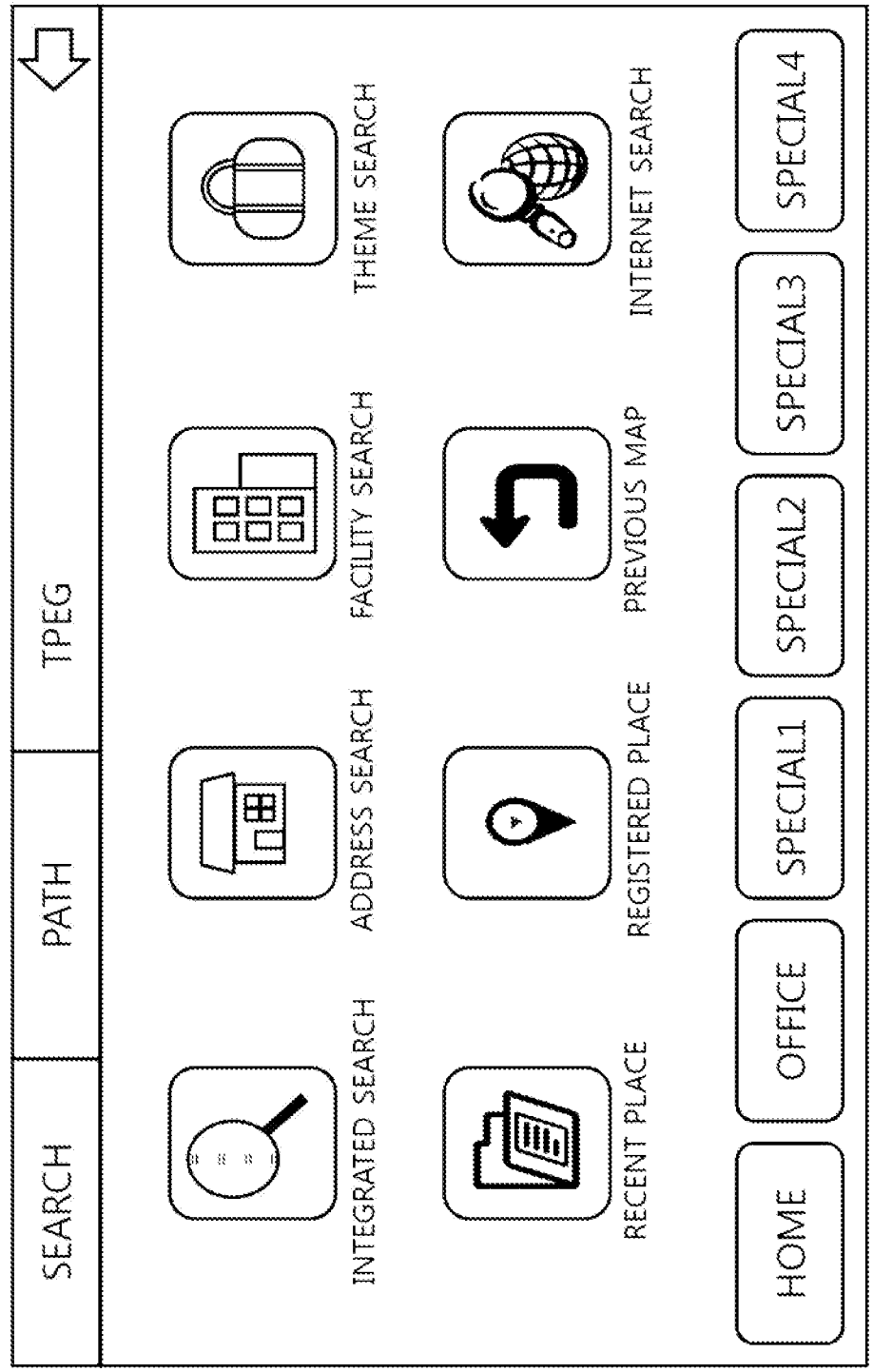
FIG. 6 is a view illustrating a first image of the navigation apparatus of the autonomous vehicle.

FIG. 6 is a view illustrating a first image of the navigation apparatus of the autonomous vehicle.

As exemplarily shown in the present figure, the first image may include at least one of an integrated search menu to search for destination information in map data stored in the navigation apparatus, an address search menu to input an address and to select a destination matching with the address, a facility search menu to input a name of a facility (a building) and to select a destination matching with the name of the facility, a theme search menu to propose destinations depending on a driver or user moving purpose, etc., and to allow a user to select one of the destinations, a recent visiting place menu to propose destination information which the driver or the user recently visits, a registered place menu to propose positions which the driver or the user stores depending on specific purposes or preferences in the navigation apparatus, a previous map menu to show a previous map state, or an Internet search menu to support Internet search. Furthermore, the first image of the navigation apparatus may be variously designed according to embodiments.

Furthermore, destinations which the user or the driver frequently utilizes (for example, my home, an office, etc.) may be set as separate menus and displayed on the first image. For example, menus including special 1, special 2, special 3, special 4, etc., may be set by the driver or the user.

Figure 7:
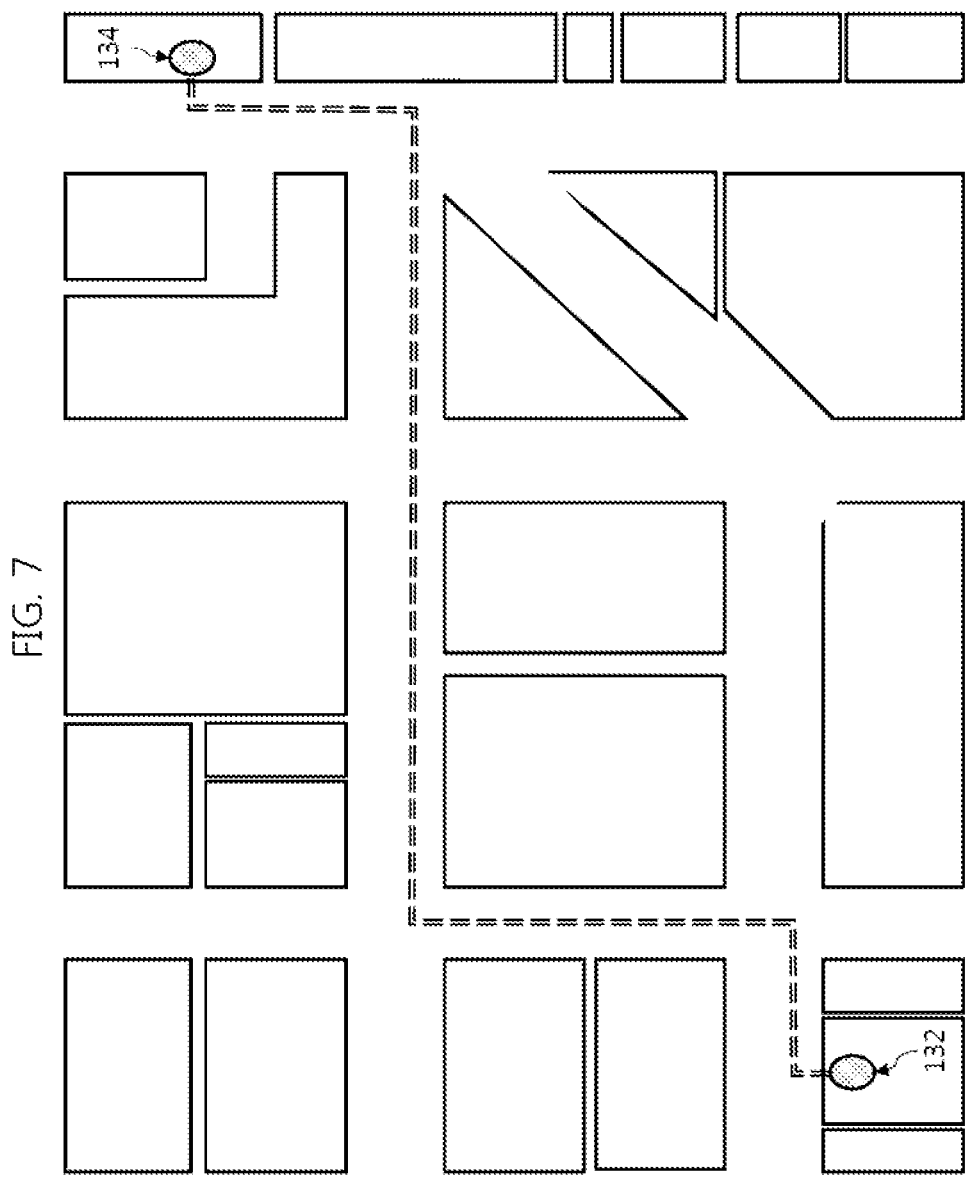
FIG. 7 is a view illustrating a driving information image of the navigation apparatus of the autonomous vehicle.

FIG. 7 is a view illustrating a driving information image of the navigation apparatus of the autonomous vehicle.

As exemplarily shown in the present figure, when a user or a driver inputs or selects information from a departure point 132 to a destination 134, the navigation apparatus may display an expected path (for example, shown in a double dashed line) from the departure point 132 to the destination 134 on a map. The user or the driver may expect movement of the autonomous vehicle through the expected path displayed by the navigation apparatus.

Furthermore, although not shown in the present figure, the navigation apparatus may display an expected time of arrival, toll payment information, a travel time, peripheral information around the expected path, etc., in addition to the expected path.

FIG. 8 is a view illustrating a parking information image of the navigation apparatus of the autonomous vehicle.

As exemplarily shown in the present figure, when a user or a driver inputs destination information through the navigation apparatus, the navigation apparatus may determine whether or not a parking lot map or parking lot information corresponding to the destination information is provided, and display the parking lot map or the parking lot information so that the user or the driver may select a parking position.

Parking space information provided to the user or the driver may include information regarding arrangement of parking spaces in the parking lot, or positions and identification numbers (for example, A1, A2, A3, A4, A5, . . . , B5, B6, B7, B8, B9, Ci, . . . , Dj, . . . ) of the parking spaces in respective parking areas, etc. If the user selects a specific parking space 136 (for example, having an identification number A4), the navigation apparatus may display an expected path of a vehicle 138 to the parking space 136 in the parking lot (for example, shown in a double dashed line).

Such a parking information image may be displayed to the driver or the user at the time of starting, or be displayed to the driver or the user when the autonomous vehicle reaches a position corresponding to the destination information or enters the position corresponding to the destination information within a predetermined distance range. According to embodiments, if the autonomous vehicle enters the parking lot, the navigation apparatus may receive information from a facility of the parking lot and display the parking information image.

Figure 9A:
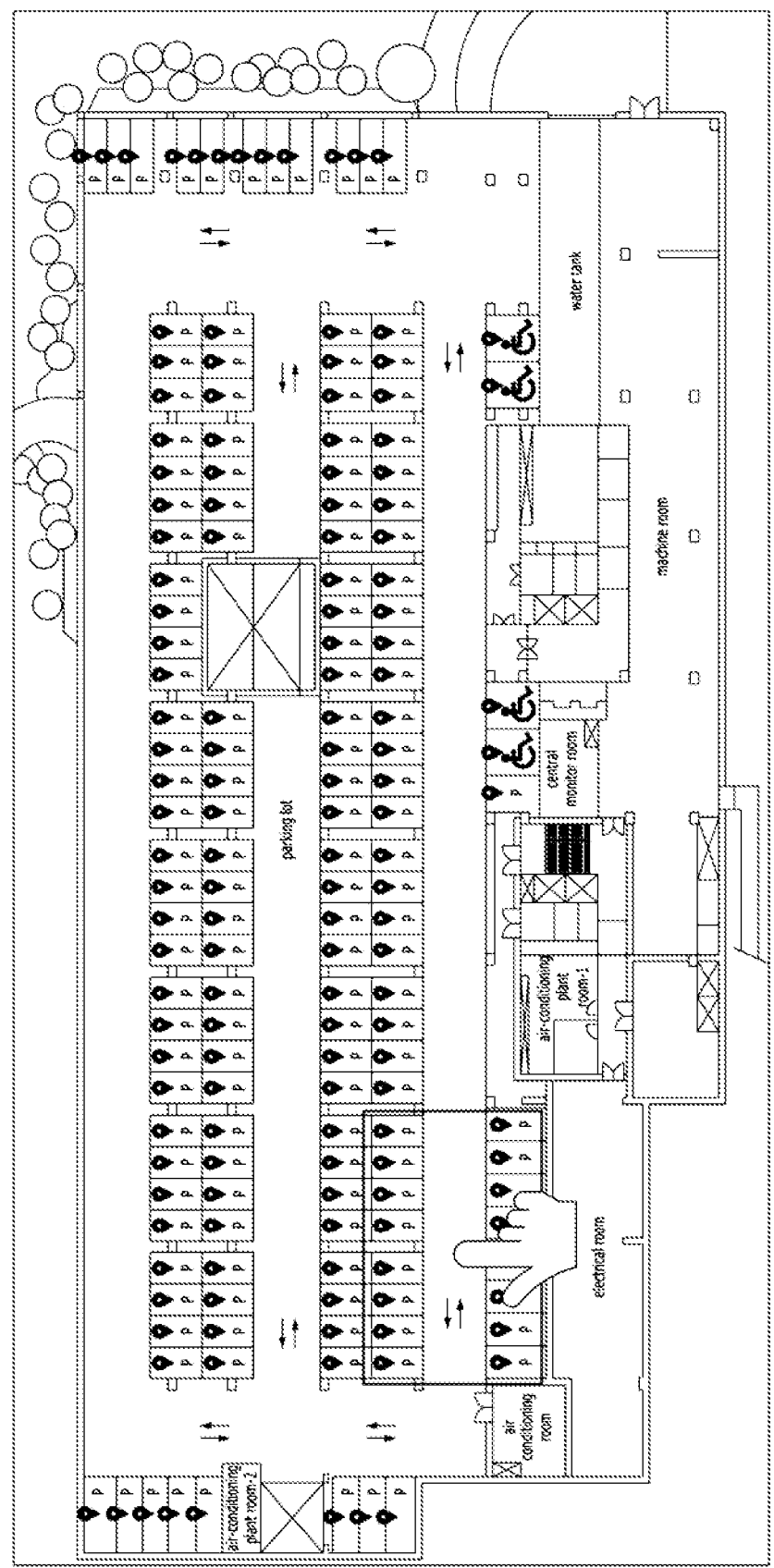
FIG. 9A and FIG. 9B are views illustrating input of parking selection information in the navigation apparatus of the autonomous vehicle.
Figure 9B:
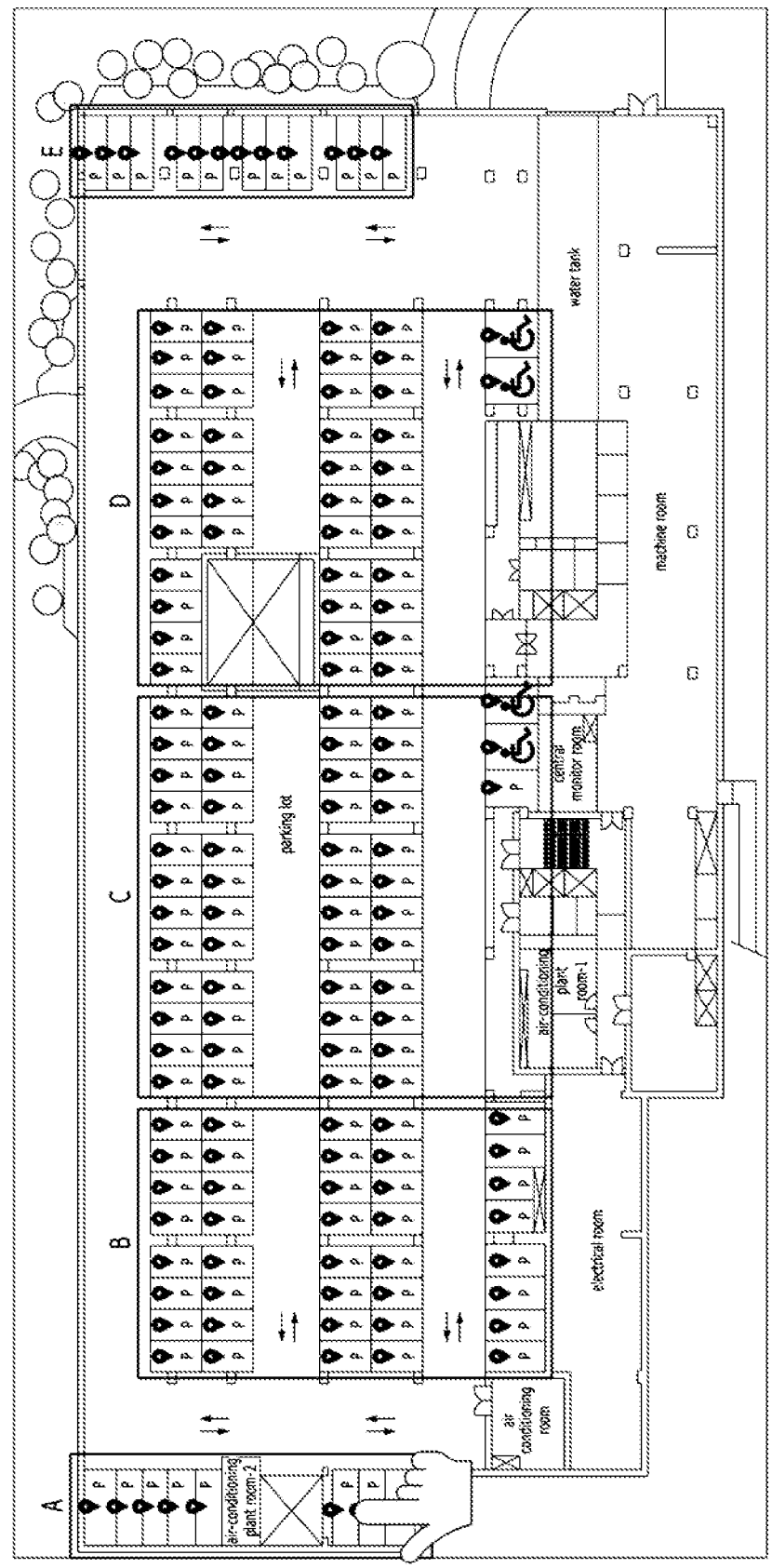

FIG. 9A and FIG. 9B are views illustrating input of parking selection information in the navigation apparatus of the autonomous vehicle. In more detail, FIG. 9(*a*) illustrates a method of selecting a parking area by gradually narrowing a range selected by a user, and FIG. 9(*b*) illustrates a method of selecting a parking area according to a management method provided by a facility of the parking lot (parking areas, identification numbers, position information, etc.). The methods shown in FIG. 9A and FIG. 9B are provided as methods of transmitting parking lot information to the user or a driver and collecting information regarding a parking area selected by the user or the driver, and may be variously designed according to embodiments.

For example, with reference to FIG. 9(*a*), if the driver selects a desired parking area to perform autonomous parking, the parking area may be directly designated. However, in the instant case, when other vehicles are parked in the corresponding parking space, the navigation apparatus may inform the driver or the user of such a fact and allow the driver or the user to select another parking area.

The method shown in FIG. 9(*a*) may cause inconvenience to the user. To compensate for such inconvenience, as exemplarily shown in FIG. 9(*b*), a method of designating a parking zone including a plurality of parking areas (for example, A, B, C, D and E) may be provided. In the instant case, the navigation apparatus may set priorities of the parking areas such that the parking area closest to an exit in the parking zone is prioritized.

Furthermore, the navigation apparatus may set a range based on a specific point in the parking lot and, if there is a vacant parking space within the corresponding range, perform autonomous parking of the autonomous vehicle without separate user or driver notification.

According to embodiments, the navigation apparatus may select an autonomous parking area according to portions of the parking lot and, if there is a vacant parking space within the corresponding parking area, perform autonomous parking of the autonomous vehicle without separate user or driver notification.

The above-described method in accordance with the embodiment may be implemented as a program executable in a computer and stored in a computer readable recording medium. Computer readable recording media include a ROM, a RAM, CD-ROM, a magnetic tape, a floppy disk, an optical data storage system, etc. Furthermore, the computer readable recording media may be realized as a carrier wave (for example, transmission over the Internet).

The computer readable recording medium may be distributed to a computer system connected by a network and, therein, code which is readable by computers may be stored and executed in a distributed manner. Furthermore, functional programs, code and code segments to implement the above-described method may be easily deduced by programmers skilled in the art.

As is apparent from the above description, an apparatus and method of controlling autonomous driving and autonomous parking through a navigation apparatus in accordance with various aspects of the present invention may have effects below.

The apparatus and method in accordance with various aspects of the present invention provide a navigation guide depending on an autonomous parking infrastructure situation, and may thus compensate for limit in establishment of infrastructure necessary for an autonomous parking service.

Furthermore, the apparatus and method in accordance with various aspects of the present invention provide measures to solve problems, which are obstacles to establishment of infrastructure in terms of various aspects including cost and regulations, based on navigation scenarios, and may thus facilitate commercialization of the autonomous parking service.

Furthermore, the apparatus and method in accordance with various aspects of the present invention determine environments in which the autonomous parking function is not available and provide an interior navigation function, and may thus improve convenience in use.

Moreover, the apparatus and method in accordance with various aspects of the present invention, if the autonomous parking function is not available, supports autonomous driving to a desired destination in a parking lot or automatically provide an interior navigation guide, and may thus improve convenience in parking.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an autonomous vehicle, the method comprising:
   receiving destination information before autonomous driving;
   providing parking space information corresponding to the destination information;
   receiving first parking selection information related to the parking space information;
   performing, by a controller, the autonomous driving based on the destination information and the first parking selection information,
   providing a road map corresponding to the destination information; and
   providing a parking lot map corresponding to the parking space information,
   wherein the autonomous driving includes movement of the autonomous vehicle to a first position corresponding to the destination information and the first parking selection information,
   wherein when the parking space information is provided, the parking space information has a parking zone including a plurality of parking areas,
   wherein the plurality of parking areas is set a priority based on a distance between the parking areas and an exit of the parking zone,
   wherein a parking space of each parking area is searched based on the set priority,
   wherein when there is a vacant parking space within a first parking area and a number of vacant parking spaces within the first parking area is more than a predetermined ratio, an autonomous parking of the autonomous vehicle is performed without a driver notification, and
   wherein when the number of the vacant parking spaces within the first parking area is the predetermined ratio or less, the driver notification is provided and a parking space of a second parking area having a priority lower than a priority of the first parking area is searched, and
   wherein the parking space information includes a number of available parking spaces in a parking lot provided in a space corresponding to the destination information, or area information in the parking lot and the number of available parking spaces in each area of the area information.

2. The method according to claim 1, further including:
   re-providing the parking space information, when the controller determines that the autonomous vehicle is incapable of being located at the first position before the autonomous driving is completed;
   receiving second parking selection information related to the parking space information; and
   locating the autonomous vehicle at a second position corresponding to the second parking selection information.

3. The method according to claim 2, wherein the parking space information includes position information corresponding to respective parking spaces in the parking lot provided in the space corresponding to the destination information.

4. The method according to claim 3, wherein the re-providing of the parking space information includes:
   determining whether there is an obstacle on a path reaching the first position, after the autonomous vehicle arrives at a position corresponding to the destination information;
   confirming whether an obstacle or other vehicle is located at the first position;
   determining whether the autonomous vehicle is capable of being located at the first position; and
   providing the parking space information based on a result of the determination.

5. The method according to claim 1, further including automatically terminating the autonomous driving depending on predetermined user input or detected driving environments or conditions during the autonomous driving.

6. The method according to claim 1, further including providing an interface for the autonomous driving, when a driver gets in the autonomous vehicle.

7. The method according to claim 1, wherein, when the parking space information corresponding to the destination information is not provided, the autonomous driving is terminated when the autonomous vehicle arrives at a position corresponding to the destination information.

8. A navigation apparatus of an autonomous vehicle, the apparatus comprising:
a storage device configured to store map information and parking space information;
an input device configured to receive destination information corresponding to the map information and first parking selection information from the parking space information corresponding to the destination information;
an output device configured to display a moving process of the autonomous vehicle on the map information and the parking space information; and
a controller configured to confirm a moving path to the destination information collected through the input device and availability of a first position corresponding to the first parking selection information during autonomous driving of the autonomous vehicle,
wherein when the parking space information is displayed, the parking space information has a parking zone including a plurality of parking areas,
wherein the plurality of parking areas is set a priority based on a distance between the parking areas and an exit of the parking zone,
wherein a parking space of each parking area is searched based on the set priority,
wherein when there is a vacant parking space within a first parking area and a number of vacant parking spaces within the first parking area is more than a predetermined ratio, an autonomous parking of the autonomous vehicle is performed without a driver notification, and
wherein when the number of the vacant parking spaces within the first parking area is the predetermined ratio or less, the driver notification is provided and a parking space of a second parking area having a priority lower than a priority of the first parking area is searched,
wherein a road map corresponding to the destination information is provided, and a parking lot map corresponding to the parking space information is provided, and
wherein the parking space information includes a number of available parking spaces in a parking lot provided in a space corresponding to the destination information, or area information in the parking lot and the number of available parking spaces in each area of the area information.

9. The navigation apparatus according to claim 8, wherein the controller is configured to receive second parking selection information related to the parking space information through the input device, in a response to the availability of the first position.

10. The navigation apparatus according to claim 8, further including a communication device configured to acquire first information regarding the moving path and second information corresponding to the availability of the first position through a wireless communication network.

11. The navigation apparatus according to claim 10, wherein the communication device is configured to:
receive the first information from a traffic information network server providing traffic information; and
receive the second information from one of the traffic information network server and a parking facility providing the parking space information.

12. The navigation apparatus according to claim 8, wherein the parking space information includes position information corresponding to respective parking space in the parking lot provided in the space corresponding to the destination information.

13. The navigation apparatus according to claim 12, wherein the controller is configured to determine whether there is an obstacle on a path reaching the first position, after the autonomous vehicle arrives at a position corresponding to the destination information, is configured to confirm whether an obstacle or other vehicle is located at the first position, and is configured to determine whether the autonomous vehicle is capable of being located at the first position.

14. The navigation apparatus according to claim 13, wherein the input device provides the parking space information based on a result of the determination of the controller.

* * * * *